United States Patent
Ito et al.

(10) Patent No.: US 10,597,598 B2
(45) Date of Patent: Mar. 24, 2020

(54) GREASE COMPOSITION AND GREASE-SEALED ROLLER BEARING

(71) Applicant: NTN CORPORATION, Osaka (JP)

(72) Inventors: Motohiro Ito, Mie (JP); Ryouta Kondou, Mie (JP); Takayuki Kawamura, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/751,860

(22) PCT Filed: Jul. 29, 2016

(86) PCT No.: PCT/JP2016/072304
§ 371 (c)(1),
(2) Date: Apr. 23, 2018

(87) PCT Pub. No.: WO2017/026299
PCT Pub. Date: Feb. 16, 2017

(65) Prior Publication Data
US 2018/0230396 A1    Aug. 16, 2018

(30) Foreign Application Priority Data
Aug. 10, 2015    (JP) ................. 2015-157988

(51) Int. Cl.
*C10M 141/06*    (2006.01)
*C10M 133/02*    (2006.01)
(Continued)

(52) U.S. Cl.
CPC ........ *C10M 141/06* (2013.01); *C10M 105/18* (2013.01); *C10M 107/02* (2013.01);
(Continued)

(58) Field of Classification Search
CPC ............ C10N 2040/02; C10N 2240/02; F16C 33/6633; F16C 33/6603
(Continued)

(56) References Cited

U.S. PATENT DOCUMENTS 5,310,491 A * 5/1994 Downs ................. C10M 159/12
508/221
5,487,839 A * 1/1996 Vinci ................... C10M 139/00
508/188
(Continued)

FOREIGN PATENT DOCUMENTS

CN    101400770 A    4/2009
CN    101910385 A    12/2010
(Continued)

OTHER PUBLICATIONS

International Search Report for PCT/JP2016/072304 dated Aug. 23, 2016.
(Continued)

*Primary Examiner* — Ellen M McAvoy
(74) *Attorney, Agent, or Firm* — Hedman & Costigan, P.C.; James V. Costigan; Kathleen A. Costigan

(57) ABSTRACT

Provided is a grease composition which can be used as a lubricant for roller bearings, exhibits excellent high temperature durability and rust preventive property, and can prevent premature flaking on the rolling surface due to hydrogen embrittlement. A roller bearing 1 is obtained by sealing a grease composition 7 in the periphery of a rolling element 4, this grease composition 7 is composed of a base oil excluding an ester-based synthetic oil, a thickener, and an additive, the additive contains (a) an alkanolamine and (b) 2,2,4-trimethyl-1,2-dihydroquinoline or a polymer thereof but does not contain an organic sulfonate, and (a) and (b) are contained at from 0.1 to 10 parts by weight with respect to
(Continued)

100 parts by weight of a total amount of the base oil and the thickener, respectively.

7 Claims, 1 Drawing Sheet

(51) Int. Cl.
*F16C 33/66* (2006.01)
*C10M 169/04* (2006.01)
*C10M 141/10* (2006.01)
*C10M 105/18* (2006.01)
*C10M 107/02* (2006.01)
*C10M 115/08* (2006.01)
*C10M 129/42* (2006.01)
*C10M 133/08* (2006.01)
*C10M 133/12* (2006.01)
*C10M 111/04* (2006.01)
*C10M 125/24* (2006.01)
*C10M 133/40* (2006.01)
*C10M 169/00* (2006.01)

(52) U.S. Cl.
CPC ......... *C10M 111/04* (2013.01); *C10M 115/08* (2013.01); *C10M 125/24* (2013.01); *C10M 129/42* (2013.01); *C10M 133/02* (2013.01); *C10M 133/08* (2013.01); *C10M 133/12* (2013.01); *C10M 133/40* (2013.01); *C10M 141/10* (2013.01); *C10M 169/00* (2013.01); *C10M 169/04* (2013.01); *F16C 33/66* (2013.01); *F16C 33/6633* (2013.01); C10M 2205/0206 (2013.01); C10M 2205/0285 (2013.01); C10M 2207/0406 (2013.01); C10M 2207/127 (2013.01); C10M 2215/042 (2013.01); C10M 2215/064 (2013.01); C10M 2215/1026 (2013.01); C10M 2215/221 (2013.01); C10M 2215/26 (2013.01); C10M 2215/28 (2013.01); C10M 2215/30 (2013.01); C10M 2223/045 (2013.01); C10N 2230/06 (2013.01); C10N 2230/08 (2013.01); C10N 2230/10 (2013.01); C10N 2230/12 (2013.01); C10N 2240/02 (2013.01); C10N 2250/10 (2013.01)

(58) Field of Classification Search
USPC ........................................ 508/261, 262, 562
See application file for complete search history.

(56) References Cited

U.S. PATENT DOCUMENTS

| | | | | |
|---|---|---|---|---|
| 5,773,393 | A * | 6/1998 | Adams | C10M 133/00 508/551 |
| 6,235,686 | B1 * | 5/2001 | Karol | C08G 73/0627 508/244 |
| 6,726,855 | B1 * | 4/2004 | Migdal | C10M 133/02 252/401 |
| 2006/0205613 | A1 | 9/2006 | Ikuma | |
| 2008/0318819 | A1 * | 12/2008 | Saita | C10M 169/06 508/463 |
| 2009/0204157 | A1 * | 8/2009 | Fernandez Dell'Oca | A61B 17/1728 606/280 |
| 2009/0232432 | A1 * | 9/2009 | Egami | C10M 161/00 384/464 |
| 2010/0092118 | A1 * | 4/2010 | Mikami | C10M 169/00 384/462 |
| 2011/0007990 | A1 * | 1/2011 | Kawamura | C10M 115/08 384/322 |
| 2011/0021392 | A1 * | 1/2011 | Wheatley | C10M 133/40 508/261 |
| 2011/0183876 | A1 * | 7/2011 | Imai | C10M 169/06 508/100 |
| 2012/0142566 | A1 * | 6/2012 | Yamamoto | C10M 169/06 508/385 |
| 2012/0314985 | A1 * | 12/2012 | Saita | C10M 169/06 384/490 |
| 2014/0336090 | A1 * | 11/2014 | Saita | F16C 33/6633 508/100 |
| 2015/0307805 | A1 * | 10/2015 | Kanda | C10M 169/02 384/462 |
| 2016/0068781 | A1 * | 3/2016 | Yao | C10M 163/00 508/280 |
| 2016/0160923 | A1 * | 6/2016 | Kawamura | C10M 169/04 384/462 |
| 2017/0152457 | A1 * | 6/2017 | Kondou | F16C 19/06 |

FOREIGN PATENT DOCUMENTS

| | | |
|---|---|---|
| CN | 103242942 A | 8/2013 |
| EP | 1731593 A2 | 12/2006 |
| EP | 1995300 A1 | 11/2008 |
| EP | 2242823 A1 | 10/2010 |
| EP | 3023657 A1 | 5/2016 |
| JP | 56-049800 A | 5/1981 |
| JP | 11-222597 A | 8/1999 |
| JP | 2005-042102 A | 2/2005 |
| JP | 2005-112902 A | 4/2005 |
| JP | 2005-188557 A | 7/2005 |
| JP | 2006-249376 A | 9/2006 |
| JP | 2007-238755 A | 9/2007 |
| JP | 2008-156624 A | 7/2008 |
| JP | 2011-514912 A | 5/2011 |
| JP | 2016-014087 A | 1/2016 |
| KR | 10-2008-0093157 A | 10/2008 |
| WO | 2009/090238 A1 | 7/2009 |
| WO | 2015/008856 A1 | 1/2015 |
| WO | 2015/021566 A1 | 2/2015 |
| WO | 2016/002739 A1 | 1/2016 |

OTHER PUBLICATIONS

Supplementary European Search Report, dated Jan. 29, 2019, in a corresponding application.

* cited by examiner

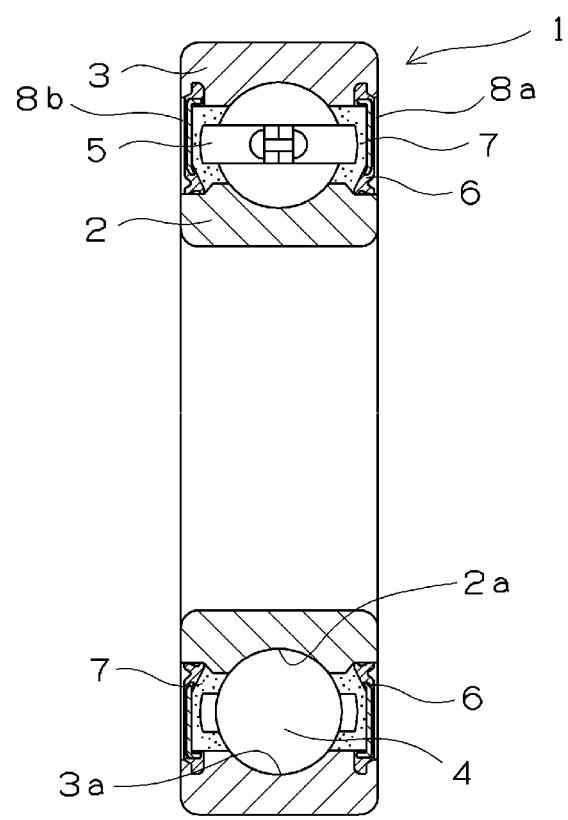

GREASE COMPOSITION AND GREASE-SEALED ROLLER BEARING

TECHNICAL FIELD

The present invention relates to a grease composition and a roller bearing in which the grease composition is sealed.

BACKGROUND ART

Hitherto, it has been attempted to blend various additives into lubricants for the purpose of improving the performance of lubricants (grease compositions and the like) to be used in rolling parts such as roller bearings in industry. In the case of using roller bearings and the like under high temperature conditions, there is a possibility that the sealed grease composition is oxidized and degraded and the lubricating film is likely to be broken so that the lubricating life span is shortened. Breakage of the lubricating film is likely to occur particularly under high temperature and high speed conditions, and metal contact between the rolling parts occurs and malfunctions that heat generation and frictional wear increase are caused when the lubricating film is broken. For this reason, an amine-based antioxidant, a phenol-based antioxidant, and the like are used in grease compositions to be used in roller bearings and the like as an antioxidant singly or in combination of plural kinds in order to improve high temperature durability. At the same time, organic sulfonates and sorbitan fatty acid esters are also used in the grease compositions as a rust-preventive agent in order to prevent the generation of rust on the rolling parts.

For example, those using a phenol-based antioxidant such as 2,2'-methylenebis(6-t-butyl-4-methylphenol), an amine-based antioxidant such as octylated diphenylamine, a sulfur-based antioxidant such as phenothiazine, and a phosphorus-based antioxidant such as zinc dithiophosphate as an antioxidant have been proposed as lubricants for bearings (see Patent Document 1). It is further described in Patent Document 1 that a rust-preventive agent such as petroleum sulfonate, dinonylnaphthalene sulfonate, or a sorbitan ester can be concurrently used as another additive.

In addition, in roller bearings, there is a possibility that unique flaking accompanied by microstructural changes occurs on the rolling surface at an early stage as sudden acceleration and deceleration are further added to the above high temperature and high speed conditions and the use conditions thus become severer. This unique flaking is different from flaking from the inside of the rolling surface caused by usual metal fatigue, is a fracture phenomenon occurring from a relatively shallow place of the rolling surface, and is considered as hydrogen embrittlement caused by hydrogen. For example, it is considered that premature flaking due to hydrogen embrittlement occurs as hydrogen is generated by the decomposition of grease and then introduced into the steel of the roller bearing. Hydrogen significantly decreases the fatigue strength of steel, thus cracks are generated and propagated around the inside of the roller surface layer at which the alternating shear stress becomes maximum, and this leads to premature flaking even under conditions to be considered as elastic fluid lubrication in which the contact elements are separated from each other by an oil film.

As a method of suppressing unique flaking phenomenon which is accompanied by such microstructural changes and occurs at an early stage, for example, a method in which bismuth dithiocarbamate is added (see Patent Document 2) and a method in which a molybdate and an organic acid salt are added (see Patent Document 3) have been proposed.

In addition, as a grease composition exhibiting excellent heat resistance, mechanical stability, water resistance, rust preventive property, load bearing property, flame retardancy, and the like, those prepared by blending tribasic calcium phosphate and a grease structure stabilizer such as a diethanolamine with a base oil composed of mineral oil and synthetic oil have been proposed (see Patent Document 4).

PRIOR ART DOCUMENTS

Patent Documents

Patent Document 1: JP 2005-188557 A
Patent Document 2: JP 2005-42102 A
Patent Document 3: JP 2005-112902 A
Patent Document 4: JP 2008-156624 A

SUMMARY OF THE INVENTION

Problems to be Solved by the Invention

Even in the case of using an antioxidant as in Patent Document 1, there is a case in which sufficient performance cannot be obtained with regard to high temperature durability depending on the kind of other additives to be combined and the temperature condition (for example, 180° C. or higher) at the time of lubrication. In addition, the use conditions of roller bearings have been severer in recent years, thus the surface pressure between the rolling element and the bearing ring is increased, sliding due to sudden acceleration and deceleration is increased, and oil film breakage (poor lubrication) at the corresponding portion is likely to occur. Under such severer environments, a conventional method by additives is insufficient as a measure to prevent the flaking phenomenon.

In addition, with regard to each of the properties such as improvement in high temperature durability, improvement in rust preventive property, prevention of premature flaking on the rolling surface due to hydrogen embrittlement, it is not easy to satisfy all of these properties at the same time even when it is attempted to cope with the flaking phenomenon by optimizing the combination of additives. This is because there is a case in which the combination of additives has a negative effect depending on the specific combination of essential components and a desired effect cannot be exerted merely by simply concurrently using known additives and the like that are suited to the respective properties required.

The present invention has been made in order to deal with such a problem, and an object thereof is to provide a grease composition which can be used as a lubricant for roller bearings, exhibits excellent high temperature durability and rust preventive property, and can prevent premature flaking on the rolling surface due to hydrogen embrittlement and a grease-sealed roller bearing in which the grease composition is sealed.

Means for Solving the Problem

The grease composition of the present invention is a grease composition which contains a base oil excluding an ester-based synthetic oil, a thickener, and an additive, in which the additive contains (a) an alkanolamine and (b) a compound represented by the following formula (1) or a polymer thereof but does not contain an organic sulfonate, and (a) and (b) above are contained at from 0.1 to 10 parts by weight with respect to 100 parts by weight of a total amount of the base oil and the thickener, respectively.

[Chem. 1]

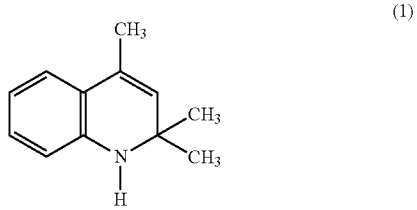

(1)

The alkanolamine is diethanolamine.

The additive contains (c) zinc dithiophosphate, (d) a metal salt of an organic acid, and (e) an amine-based antioxidant and (c) to (e) above are contained at from 0.1 to 10 parts by weight with respect to 100 parts by weight of a total amount of the base oil and the thickener, respectively. In addition, the metal salt of an organic acid is disodium sebacate and the amine-based antioxidant is octylated diphenylamine.

The base oil is at least one oil selected from an alkyl diphenyl ether oil and a poly-α-olefin (hereinafter also referred to as "PAO") oil. In addition, the thickener is an alicyclic diurea compound.

The grease-sealed bearing of the present invention is obtained by sealing the grease composition of the present invention therein.

Effect of the Invention

The grease composition of the present invention contains a base grease composed of a base oil excluding an ester-based synthetic oil and a thickener and, as an additive, (a) an alkanolamine and (b) a predetermined quinoline-based antioxidant in predetermined amounts but does not contain an organic sulfonate, and it thus exhibits excellent high temperature durability and rust preventive property and can prevent premature flaking on the rolling surface and the like due to hydrogen embrittlement by being sealed in a roller bearing and the like.

In addition, the above effect can be further exerted since the grease composition contains (c) zinc dithiophosphate, (d) a metal salt of an organic acid such as disodium sebacate, and (e) an amine-based antioxidant such as octylated diphenylamine as an additive in predetermined amounts.

The grease-sealed roller bearing of the present invention is obtained by sealing the grease composition of the present invention therein, and it thus exhibits excellent high temperature durability and rust preventive property, can prevent premature flaking on the rolling surface due to hydrogen embrittlement, and has a long life span.

BRIEF DESCRIPTION OF THE DRAWING

FIG. 1 is a cross-sectional view of an example of a grease-sealed roller bearing of the present invention.

MODE FOR CARRYING OUT THE INVENTION

The grease composition of the present invention is composed of a base oil excluding an ester-based synthetic oil, a thickener, and an additive, and this additive contains (a) an alkanolamine and (b) a predetermined quinoline-based antioxidant but does not contain an organic sulfonate. In addition, the additive contains (c) zinc dithiophosphate, (d) a metal salt of an organic acid, and (e) an amine-based antioxidant if necessary.

By blending (a) alkanolamine (chelating agent), it is possible to prevent direct contact of the iron-based metal new surface with the grease as the alkanolamine is adsorbed (chelating action) or the like onto the frictional wear surface or the iron-based metal new surface exposed by wear even in a case in which the oil film becomes thinner under severe conditions (boundary lubrication conditions) on the rolling surface. This makes it possible to suppress the generation of hydrogen by decomposition of the grease and to prevent premature flaking on the rolling surface due to hydrogen embrittlement. In addition, an organic sulfonate is excluded since the effect of the alkanolamine is hindered when an organic sulfonate such as zinc sulfonate or calcium sulfonate, which is an existing rust-preventive agent, is concurrently used in the case of using such an alkanolamine as an additive. Furthermore, high temperature durability is improved while maintaining the effect of preventing premature flaking by the alkanolamine by employing (b) a predetermined quinoline-based antioxidant as an antioxidant.

(a) Alkanolamine

Examples of the alkanolamine to be used in the present invention may include primary alkanolamines such as monoisopropanolamine, monoethanolamine, and mono-n-propanolamine, secondary alkanolamines such as N-alkyl-monoethanolamine and N-alkylmonopropanolamine, and tertiary alkanolamines such as triethanolamine, cyclohexyldiethanolamine, tri(n-propanol)amine, triisopropanolamine, N,N-dialkylethanolamine, and N-alkyl (or alkenyl)diethanolamine. In addition, alkanolamines are classified into a monoalkanolamine, a dialkanolamine, and a trialkanolamine depending on the number of alkanol groups, but in the present invention, it is preferable to use dialkanolamine or trialkanolamine since iron ions are sandwiched by the chelating action of a plurality of hydroxyl groups (alkanol groups) and amino groups, and exposure of the iron-based metal new surface is likely to be prevented.

Among these, it is preferable to use N-alkyl (or alkenyl) diethanolamine represented by the following formula (2) since it exhibits excellent compatibility with the base oil and flaking preventing ability and is excellently available.

[Chem. 2]

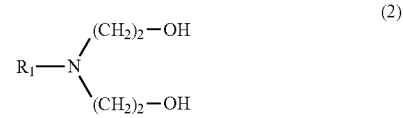

(2)

In the formula, $R_1$ represents a linear or branched alkyl group having from 1 to 20 carbon atoms or alkenyl group. In addition, the number of carbon atoms is preferably from 1 to 12 and more preferably from 1 to 8. Examples of specific compounds thereof may include N-methyldiethanolamine, N-ethyldiethanolamine, N-propyldiethanolamine, N-butyldiethanolamine, N-pentyldiethanolamine, N-hexyldiethanolamine, N-heptyldiethanolamine, N-octyldiethanolamine, N-nonyldiethanolamine, N-decyldiethanolamine, N-undecyldiethanolamine, N-lauryldiethanolamine, N-tridecyldiethanolamine, N-myristyldiethanolamine, N-pentadecyldiethanolamine, N-palmityldiethanolamine, N-heptadecyldiethanolamine, N-oleyldiethanolamine, N-stearyldiethanolamine, N-isostearyldiethanolamine, N-nonadecyldiethanolamine, and N-eicosyldiethanolamine.

The alkanolamines may be used singly or in combination of two or more kinds thereof. In addition, the alkanolamine is preferably liquid or pasty at room temperature and the use temperature. In addition, it may be in a state of being dispersed in a solvent or the like. By using such an alkanolamine, it is likely to enter the corresponding portion even in a case in which the oil film of the rolling surface and the like becomes thinner under severe conditions. The kinematic viscosity of the alkanolamine is preferably from 10 to 100 mm²/s at 40° C. and more preferably from 40 to 70 mm²/s at 40° C.

Examples of commercially available products of alkanolamine (tertiary diethanolamine) may include ADEKA KIKU-LUBE FM-812 and ADEKA KIKU-LUBE FM-832 manufactured by ADEKA CORPORATION.

The proportion of the alkanolamine blended in the grease composition is set to from 0.1 to 10 parts by weight with respect to 100 parts by weight of the total amount of the base oil and the thickener. There is a possibility that premature flaking due to hydrogen embrittlement cannot be sufficiently prevented when the proportion is less than 0.1 part by weight. In addition, there is a possibility that the reactivity of the alkanolamine with iron increases too high and corrosive wear is caused when the proportion exceeds 10 parts by weight. The proportion is preferably from 0.3 to 10 parts by weight, more preferably from 0.3 to 5 parts by weight, and still more preferably from 2 to 5 parts by weight.

(b) Quinoline-Based Antioxidant

The quinoline-based antioxidant to be used in the present invention is 2,2,4-trimethyl-1,2-dihydroquinoline which is a compound represented by the following formula (1) and a condensate (polymer) of a dimer or higher compound of this. In addition, a mixture of the compound and a polymer may be used.

[Chem. 3]

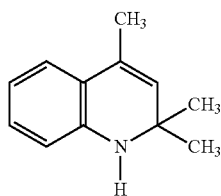

(1)

This polymer corresponds to the age resister "TMDQ" of JIS K 6220-3, and the physical properties thereof may include a softening point of from 80 to 110° C., a specific gravity of from 1.06 to 1.11, an ash content of 0.5% or less. Examples of commercially available products which can be used in the present invention may include VANLUBE RD manufactured by Vanderbilt Chemicals, LLC and NOCRAC (registered trademark) 224 manufactured by OUCHI SHINKO CHEMICAL INDUSTRIAL CO., LTD.

The proportion of the quinoline-based antioxidant blended in the grease composition is set to from 0.1 to 10 parts by weight with respect to 100 parts by weight of the total amount of the base oil and the thickener. There is a possibility that sufficient improvement in high temperature durability is not achieved when the proportion is less than 0.1 part by weight. In addition, there is a possibility that not only the performance is not improved but also high temperature durability rather deteriorates by evaporation of the degradation product of the antioxidant, or the like when the proportion exceeds 10 parts by weight. The proportion is preferably from 0.3 to 10 parts by weight, more preferably from 0.3 to 5 parts by weight, and still more preferably from 2 to 5 parts by weight.

(c) Zinc Dithiophosphate

Examples of zinc dithiophosphate (hereinafter referred to as "ZnDTP") to be used in the present invention may include zinc dialkyl dithiodithiophosphate represented by the following formula (3) and zinc diaryl dithiophosphate.

[Chem. 4]

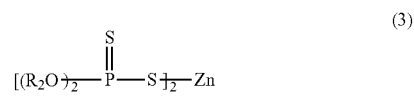

(3)

$R_2$ in the formula represents a primary or secondary alkyl group having from 1 to 24 carbon atoms or an aryl group having from 6 to 30 carbon atoms. Examples of $R_2$ may include a methyl group, an ethyl group, a propyl group, an isopropyl group, a butyl group, a secondary butyl group, an isobutyl group, a pentyl group, a 4-methylpentyl group, a hexyl group, a 2-ethylhexyl group, a heptyl group, an octyl group, a nonyl group, a decyl group, an isodecyl group, a dodecyl group, a tetradecyl group, a hexadecyl group, an octadecyl group, an eicosyl group, a docosyl group, a tetracosyl group, a cyclopentyl group, a cyclohexyl group, a methylcyclohexyl group, an ethylcyclohexyl group, a dimethylcyclohexyl group, a cycloheptyl group, a phenyl group, a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, a dodecylphenyl group, a tetradecylphenyl group, a hexadecylphenyl group, an octadecylphenyl group, and a benzyl group. Incidentally, each of these $R_2$ may be the same as or different from each other.

Among these, $R_2$ is preferably a primary alkyl group since it exhibits excellent stability and contributes to the prevention of premature flaking on the rolling surface due to hydrogen embrittlement. In addition, in a case in which $R_2$ is an alkyl group, ZnDTP is superior in heat resistance and is more soluble in the base oil as the number of carbon atoms is larger. On the other hand, ZnDTP is superior in wear resistance and is less soluble in the base oil as the number of carbon atoms is smaller. Examples of preferred commercially available products of ZnDTP may include ADEKA KIKU-LUBE 2112 manufactured by ADEKA CORPORATION.

(d) Metal Salt of Organic Acid

As the metal salt of an organic acid to be used in the present invention, any metal salt of an organic acid can be used as long as it is a metal salt (alkali metal salt or alkaline earth metal salt) of an aromatic organic acid, an aliphatic organic acid, or an alicyclic organic acid. In addition, monobasic and polybasic organic acids can be used as the organic acid.

Specific examples of the organic acid may include monovalent saturated fatty acids such as acetic acid, propionic acid, butyric acid, valeric acid, caproic acid, heptanoic acid, caprylic acid, pelargonic acid, capric acid, undecylic acid, lauric acid, tridecylic acid, myristic acid, pentadecylic acid, palmitic acid, margaric acid, stearic acid, nonadecylic acid, and arachic acid, monovalent unsaturated fatty acids such as acrylic acid, crotonic acid, undecylenic acid, oleic acid, and gadoleic acid, divalent saturated fatty acids such as malonic acid, methylmalonic acid, succinic acid, methylsuccinic acid, dimethylmalonic acid, ethylmalonic acid, glutaric acid, adipic acid, dimethylsuccinic acid, pimelic acid, tetramethylsuccinic acid, suberic acid, azelaic acid, and sebacic acid, divalent unsaturated fatty acids such as fumaric acid, maleic acid, and oleic acid, fatty acid derivatives such as tartaric acid and citric acid, and aromatic organic acids such as benzoic acid, phthalic acid, trimellitic acid, and pyromellitic acid.

Among the metal salts of organic acids, a sodium salt is preferable. Specific examples of preferred metal salts of organic acids may include sodium benzoate, monosodium sebacate, disodium sebacate, monosodium succinate, and disodium succinate.

(e) Amine-Based Antioxidant

As the amine-based antioxidant to be used in the present invention, a known amine-based antioxidant such as an alkyl diphenylamine such as octylated diphenylamine or N-phenyl-1-naphthylamine can be used.

The proportion of the additives (c) to (e) blended in the grease composition is preferably set to from 0.1 to 10 parts by weight with respect to 100 parts by weight of the total amount of the base oil and the thickener. The proportion is more preferably from 0.3 to 5 parts by weight and still more preferably 0.5 to 1.5 parts by weight.

Hereinafter, the base oil and thickener will be described.

The base oil in the grease composition of the present invention is not particularly limited except that an ester-based synthetic oil is excluded, and a general base oil to be usually used in the field of grease can be used. The reason for that an ester-based synthetic oil is excluded is because a desired effect is not obtained when an ester-based synthetic oil is used as the base oil (Comparative Example 6 in Table 1 to be described later). As the base oil, for example, highly refined oils, mineral oils, ether-based synthetic oils, synthetic hydrocarbon oils (PAO oils), silicone oils, fluorine oils, and mixtures thereof can be used. Among these, synthetic oils are preferable, and particularly at least one oil selected from an alkyl diphenyl ether oil and a PAO oil is preferable.

Examples of the alkyl diphenyl ether oil may include a monoalkyl diphenyl ether oil, a dialkyl diphenyl ether oil, and a polyalkyl diphenyl ether.

A PAO oil is a mixture of oligomers or polymers of α-olefins or isomerized α-olefins. Specific examples of α-olefins may include 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and 1-tetradocosene, and usually any mixture thereof is used.

A more preferred aspect of the base oil is an oil containing an alkyl diphenyl ether oil as an essential component at 25% by weight or more (preferably 50% by weight or more) with respect to the whole base oil. An alkyl diphenyl ether oil exhibits excellent acid value stability and excellent high temperature durability.

The kinematic viscosity of the base oil (kinematic viscosity of mixed oil in case of mixed oil) is preferably from 10 to 200 mm$^2$/s at 40° C. The kinematic viscosity is more preferably from 30 to 150 mm$^2$/s and still more preferably from 30 to 100 mm$^2$/s.

The thickener in the grease composition of the present invention is not particularly limited, and a general thickener to be usually used in the field of grease can be used. For example, soap-based thickeners such as metal soap and composite metal soap and non-soap-based thickeners such as benton, silica gel, a urea compound, and a urea/urethane compound can be used. Examples of the metal soap may include sodium soap, calcium soap, aluminum soap, and lithium soap, and examples of the urea compound and the urea/urethane compound may include a diurea compound, a triurea compound, a tetraurea compound, another polyurea compound, and a diurethane compound. Among these, it is preferable to use a urea compound which exhibits excellent heat resistance and durability and excellent interventional property and adhesive property to the rolling surface.

The urea compound is obtained by reacting a polyisocyanate component with a monoamine component. Examples of the polyisocyanate component may include phenylene diisocyanate, tolylene diisocyanate, diphenyl diisocyanate, diphenylmethane diisocyanate, octadecane diisocyanate, decane diisocyanate, and hexane diisocyanate. In addition, an aliphatic monoamine, an alicyclic monoamine, and an aromatic monoamine can be used as the monoamine component. Examples of the aliphatic monoamine may include hexylamine, octylamine, dodecylamine, hexadecylamine, octadecylamine, stearylamine, and oleylamine. Examples of the alicyclic monoamine may include cyclohexylamine. Examples of the aromatic monoamine may include aniline and p-toluidine.

Among these urea compounds, it is preferable to use diurea compounds using aromatic diisocyanates as a polyisocyanate component, for example, an aromatic diurea compound using an aromatic monoamine, an aliphatic diurea compound using an aliphatic monoamine, or an alicyclic diurea compound using an alicyclic monoamine, as a monoamine component since these exhibits particularly excellent heat resistance and durability. In particular, it is preferable to use an alicyclic diurea compound since it exhibits excellent oil supply property in the outer ring rotation application and the like.

A base grease is obtained by blending a thickener such as a urea compound with the base oil. The base grease using a urea compound as a thickener is prepared by reacting a polyisocyanate component with a monoamine component in a base oil. The proportion of the thickener blended in the base grease is from 1% to 40% by weight and preferably from 3% to 25% by weight. The thickening effect decreases and it is difficult to form a grease when the content of the thickener is less than 1% by weight, and the base grease obtained is too hard and it is difficult to obtain a desired effect when the content exceeds 40% by weight.

The worked penetration (JIS K 2220) of the grease composition of the present invention is preferably in a range of from 200 to 350. There is a possibility that oil separation is small and poor lubrication occurs when the penetration is less than 200. On the other hand, it is not preferable that the penetration exceeds 350 since the grease is soft and is likely to flow out of the bearing.

In the grease composition of the present invention, (a) the alkanolamine is present not in the form of a reaction product such as a salt with an acid but as it is. Hence, an additive which forms a salt with the alkanolamine such as a fatty acid is not contained as another additive. The grease composition may contain known additives if necessary in a range in which such an object of the present invention is not impaired.

The grease composition of the present invention is used for the lubrication of rolling parts. For example, the grease composition is used in roller bearings, gears, and the constituent parts thereof by being sealed in the place to be lubricated. The use temperature of this grease composition to be assumed is, for example, 150° C. or higher and particularly 180° C. or higher, and the upper limit is about 200° C. In other words, the use temperature range is, for example, from 150° C. to 200° C. and particularly from 180° C. to 200° C. In addition, the grease composition can be suitably utilized under the above-mentioned high temperature atmosphere and even under severer conditions in which sudden acceleration and deceleration are further added.

The grease-sealed roller bearing in which a grease composition of the present invention is sealed will be described with reference to FIG. 1. FIG. 1 is a cross-sectional view of a deep groove ball bearing. In a roller bearing 1, an inner ring 2 having an inner ring rolling surface 2a on an outer peripheral surface thereof and an outer ring 3 having an outer ring rolling surface 3a on an inner peripheral surface thereof are concentrically disposed and a plurality of rolling elements 4 are disposed between the inner ring rolling surface 2a and the outer ring rolling surface 3a. This rolling element 4 is held by a cage 5. In addition, both end openings 8a and 8b in the axial direction of the inner and outer rings are sealed by a sealing member 6, and the grease composition 7 described above is sealed at least in the periphery of the rolling elements 4. The inner ring 2, the outer ring 3, and the rolling elements 4 are formed of an iron-based metallic material and lubricated as the grease composition 7 is interposed on the rolling surface with the rolling elements 4.

In the roller bearing 1, the iron-based metallic material constituting the bearing members such as the inner ring 2, the outer ring 3, the rolling elements 4, and the cage 5 is an arbitrary material to be generally used as a bearing material, and examples thereof may include high carbon chromium bearing steel (SUJ 1, SUJ 2, SUJ 3, SUJ 4, SUJ 5, and the like; JIS G 4805), cement steel (SCr 420, SCM 420, and the like; JIS G 4053), stainless steel (SUS 440 C and the like; JIS G 4303), high-speed steel (M 50 and the like), and cold-rolled steel. In addition, the sealing member 6 may be made of a metal or may be a single rubber molded body or a composite of a rubber molded body with a metal plate, a plastic plate, or a ceramic plate. A composite of a rubber molded body with a metal plate is preferable from the viewpoint of durability and ease of fixing.

In FIG. 1, a ball bearing is illustrated as a bearing, but the roller bearing of the present invention can also be used as a cylindrical roller bearing, a tapered roller bearing, a self-aligning roller bearing, a needle roller bearing, a thrust cylindrical roller bearing, a thrust tapered roller bearing, a thrust needle roller bearing, a thrust self-aligning roller bearing, or the like other than the above roller bearing.

EXAMPLES

The present invention will be specifically described with reference to Examples and Comparative Examples, but the present invention is not limited to these examples at all.

Examples 1 to 5 and Comparative Examples 1 to 6

In a half amount of the base oil presented in Table 1, 4,4'-diphenylmethane diisocyanate (hereinafter referred to as "MDI") was dissolved at the proportion presented in the table, and monoamine was dissolved in the remaining half of the base oil in an amount to be two times the equivalent of MDI. The respective blended proportions and kinds are as presented in the table. The solution in which monoamine was dissolved was added to the solution in which MDI was dissolved while stirring the solution in which MDI was dissolved, the reaction was conducted by continuously stirring the mixed solution at from 100° C. to 120° C. for 30 minutes, thereby obtaining a base grease in which a diurea compound was produced in a base oil. The respective additives were added to this at the blended proportions presented in Table 1, and the mixture was further sufficiently stirred. Thereafter, the resultant mixture was homogenized by using a triple roll, thereby obtaining a grease composition for testing.

The grease composition thus obtained was sealed in a roller bearing and subjected to the following sudden acceleration and deceleration test, high temperature durability test, and rust test. The test methods and the test conditions are described below.

<Sudden Acceleration and Deceleration Test>

The grease composition was sealed in a roller bearing (inner ring, outer ring, steel balls were bearing steel SUJ 2, model number: 6203 LLU (with seal)) supporting the rotating shaft and subjected to a sudden acceleration and deceleration test. As the sudden acceleration and deceleration test conditions, an operation condition in which the atmosphere was a room temperature (25° C.) atmosphere, the load applied to a pulley attached to the tip of the rotating shaft was 1960 N and the rotational speed was from 0 rpm to 20000 rpm was set, and the test was conducted in a state in which a current of 0.7 A was flowing in the test bearing. Thereafter, the time (flaking occurring life span, h) until abnormal flaking occurred in the bearing and the vibration of the vibration detector exceeded the set value and stopped was measured. The results are presented in Table 1.

<High Temperature Durability Test>

The grease composition was sealed in a roller bearing (20 mm in inner diameter×47 mm in outer diameter×14 mm in thickness, model number: 6204 ZZ (with seal)), the roller bearing was rotated at an axial load of 67 N, a radial load of 67 N, a bearing temperature of 180° C., and a rotational speed of 10000 rpm, and the time (high temperature durable life span, h) until seizing occurred was measured. The results are presented in Table 1.

<Rust Test>

In conformity with the rust test method prescribed in ASTM D 1743, the test was conducted by setting the test conditions to a severer condition for rust generation. In a tapered roller bearing 30204 which was previously degreased with an organic solvent and dried, 2.0 g of the grease composition thus obtained was sealed, and the tapered roller bearing was then subjected to an running-in operation at a rotational speed of 1800 rpm for 1 minute by adding an axial load of 98 N. Next, this bearing was immersed in 1% by weight saline solution, then placed in a hermetically closed high humidity container having a pressure reached the saturated water vapor pressure at 40° C., and left to stand at 40° C. for 48 hours, and the rusting situation was then examined. With regard to the rusting situation, the outer ring race was divided into 32 equal sections in the circumferential direction, the rusted sections were counted, and the rust occurrence probability (percentage %) was calculated. The results are presented in Table 1.

TABLE 1

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Base oil (parts by weight) | | | | | | | | | | | |
| Ether oil[1] | 68 | 68 | 60 | 68 | 68 | 68 | 68 | 68 | 68 | 68 | — |
| PAO oil[2] | 17 | 17 | 20 | 17 | 17 | 17 | 17 | 17 | 17 | 17 | — |
| Ester oil[3] | — | — | — | — | — | — | — | — | — | — | 85 |
| Thickener (parts by weight) | | | | | | | | | | | |
| Amine: cyclohexylamine | 6.6 | 6.6 | — | 6.6 | 6.6 | 6.6 | 6.6 | 6.6 | 6.6 | 6.6 | 6.6 |
| Amine: p-toluidine | — | — | 9.3 | — | — | — | — | — | — | — | — |
| Isocyanate: MDI[4] | 8.4 | 8.4 | 10.7 | 8.4 | 8.4 | 8.4 | 8.4 | 8.4 | 8.4 | 8.4 | 8.4 |
| Additive (parts by weight) | | | | | | | | | | | |
| Anti-flaking agent | | | | | | | | | | | |
| ZnDTP[5] | 1 | 1 | 1 | 1 | 1 | 1 | 1 | 1 | 1 | 1 | 1 |
| Disodium sebacate | 1 | 1 | 1 | — | 1 | 1 | 1 | 1 | 1 | 1 | 1 |
| Chelating agent[6] | 2 | 5 | 2 | 2 | 2 | — | 2 | 2 | 2 | — | 2 |
| Sodium molybdate | — | — | — | — | — | — | — | — | — | 2 | — |
| Antioxidant | | | | | | | | | | | |
| Quinoline-based[7] | 1 | 1 | 1 | 1 | 1 | 1 | — | 1 | 1 | 1 | 1 |
| Amine-based[8] | 1 | 1 | 1 | 1 | 1 | 1 | 1 | 1 | 1 | 1 | 1 |
| Rust-preventive agent | | | | | | | | | | | |
| Zn sulfonate[9] | — | — | — | — | — | — | — | 1 | — | — | — |
| Ca sulfonate[10] | — | — | — | — | — | — | — | — | 1 | — | — |
| Sorbitan trioleate | — | — | — | — | 1 | — | — | — | — | — | — |
| High-temperature durable life span, h | 820 | 940 | 800 | 710 | 730 | 750 | 550 | 640 | 950 | 620 | 1010 |
| Flaking life span, h | 30 | 32 | 32 | 28 | 29 | 22 | 24 | 21 | 23 | 25 | 22 |
| Rust test, rust occurrence rate % | 3 | 2 | 3 | 17 | 0 | 60 | 4 | 5 | 0 | 32 | 6 |

[1] MORESCO HILUBE LB-100 (kinematic viscosity at 40° C.: 102 mm²/s) manufactured by MORESCO Corporation
[2] Shinfluid 801 (kinematic viscosity at 40° C.: 46 mm²/s) manufactured by NIPPON STEEL & SUMIKIN CHEMICAL CO., LTD.
[3] H2362 (kinematic viscosity at 40° C.: 72 mm²/s) manufactured by HATCO Corporation
[4] Diisocyanate (MDI): Mirionate MT manufactured by Nippon Polyurethane Industry Co., Ltd.
[5] ADEKA KIKU-LUBE Z-112 manufactured by ADEKA CORPORATION
[6] ADEKA KIKU-LUBE FM-812 manufactured by ADEKA CORPORATION
[7] VANLUBE RD manufactured by Vanderbilt Chemicals, LLC
[8] NOCRAC AD-F (DDPA) manufactured by OUCHI SHINKO CHEMICAL INDUSTRIAL CO., LTD.
[9] NA-SUL ZS manufactured by King Industries, Inc.
[10] MORESCO Amber-SC45 manufactured by MORESCO Corporation As presented in Table 1, in the respective Examples, it is possible to suppress the occurrence of premature flaking on the rolling surface due to hydrogen embrittlement while exhibiting excellent high temperature durability and further it can be seen that the grease composition exhibits sufficient rust preventive property. In addition, in Comparative Examples 3 and 4 containing an organic sulfonate, the results other than the rust preventive property are inferior to those of Examples even in the case of containing the predetermined additives of the present application.

INDUSTRIAL APPLICABILITY

The grease composition of the present invention exhibits excellent high temperature durability and rust preventive property and can prevent premature flaking on the rolling surface due to hydrogen embrittlement, and it can be thus suitably utilized as a lubricant for roller bearings to be used under severe conditions such as high temperature, high speed, and sudden acceleration and deceleration.

REFERENCE SIGNS LIST

1 Roller bearing
2 Inner ring
3 Outer ring
4 Rolling element
5 Cage
6 Sealing member
7 Grease composition
8a, 8b Opening

The invention claimed is:
1. A grease composition consisting of:
a base oil excluding an ester-based synthetic oil;
a thickener; and
an additive, wherein
the additive consists of (a) an alkanolamine (b) a compound represented by the following formula (1) or a polymer of the compound; (c) zinc-dithiophosphate, (d) a metal salt of an organic acid, and (e) an amine-based antioxidant, but does not contain an organic sulfonate, wherein

(a) and (b) above are contained at from 0.1 to 10 parts by weight with respect to 100 parts by weight of a total amount of the base oil and the thickener, respectively;

(c), (d) and (e) above are contained at from 0.1 to 10 parts by weight with respect to 100 parts by weight of a total amount of said base oil and the thickener, respectively

[Chem. 1]

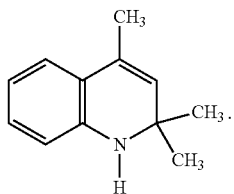

(1)

2. The grease composition according to claim 1, wherein the alkanolamine is diethanolamine.

3. The grease composition according to claim 1, wherein the metal salt of an organic acid is disodium sebacate and the amine-based antioxidant is octylated diphenylamine.

4. The grease composition according to claim 1, wherein the alkanolamine is diethanolamine,
the additive contains (c) zinc dithiophosphate, (d) a metal salt of an organic acid, and (e) an amine-based antioxidant, wherein (c) to (e) above are contained at from 0.1 to 10 parts by weight with respect to 100 parts by weight of a total amount of the base oil and the thickener, respectively, and
the metal salt of an organic acid is disodium sebacate and the amine-based antioxidant is octylated diphenylamine.

5. The grease composition according to claim 1, wherein the base oil is at least one oil selected from an alkyl diphenyl ether oil and a poly-α-olefin oil.

6. The grease composition according to claim 1, wherein the thickener is an alicyclic diurea compound.

7. A grease-sealed roller bearing comprising a grease composition sealed in the grease-sealed roller bearing, wherein
the grease composition is the grease composition according to claim 1.

* * * * *